July 6, 1965 R. J. KERR 3,193,836

PLAYBACK APPARATUS FOR ELECTROSTATICALLY RECORDED SIGNALS

Filed March 19, 1962 2 Sheets-Sheet 1

INVENTOR
ROBERT JAMES KERR

BY

ATTORNEY

July 6, 1965 R. J. KERR 3,193,836

PLAYBACK APPARATUS FOR ELECTROSTATICALLY RECORDED SIGNALS

Filed March 19, 1962 2 Sheets-Sheet 2

INVENTOR
ROBERT JAMES KERR

BY [signature]

ATTORNEY

United States Patent Office 3,193,836
Patented July 6, 1965

3,193,836

PLAYBACK APPARATUS FOR ELECTROSTATICALLY RECORDED SIGNALS

Robert James Kerr, Media, Pa., assignor to E. I. du Pont de Nemours and Company, Wilmington, Del., a corporation of Delaware Filed Mar. 19, 1962, Ser. No. 180,484
4 Claims. (Cl. 346—74)

This invention relates to electrostatic recording playback apparatus, and more particularly an improved signal-sensing electrode to be employed in the playback of electrostatic recordings.

Electrostatic recording and reproduction of information in the form of voice, music and pulse signals offers distinct advantages over conventional systems of recording, such as magnetic recording and electro-mechanical disc recording. For example, the low-cost record medium makes this system especially attractive for mass usage. Widespread acceptance in the recording arts, and the development of satisfactory apparatus for general use, however, has been curtailed by the limited response of the playback apparatus to recorded signals of high frequency, i.e., of a wavelength less than about 2 mils.

Electrical playback of electrostatically recorded variable amplitude signals is usually accomplished by placing a probe or electrode near or in contact with the moving recorded medium; the probe senses the recorded signal by induction. The sharper the probe the higher the frequency capable of being played back. Accordingly, efforts to improve the high frequency response have been directed to the use of sharp, knife-like electrodes extending transversely across the moving medium or tape. A point of diminishing returns is reached, however, where increases in sharpness effect no further improvement in high frequency response.

Therefore, it is an object of this invention to provide an improved playback electrode structure operative to extend the high frequency range of electrostatic recording.

It is a further object of this invention to provide a playback electrode structure having an improved signal-to-noise ratio at high frequencies.

It is still a further object of this invention to provide an electrical input circuit adapted to use with the improved electrode structure.

The foregoing and related objects are accomplished by the present invention which, briefly stated, comprises, in apparatus for the playback of information from electrostatically recorded dielectric medium comprising in combination a frontal signal sensing electrode, an opposed backing electrode, means for passing between said electrodes a dielectric material, e.g., a thin, flexible dielectric tape, which contains electrostatic charges corresponding to an electrostatically recorded signal whereby to induce in said electrodes an electric signal of an electromotive force proportional to said charges, and amplifier means effective to amplify the induced signals; the improvement which comprises a frontal electrode of laminar construction comprising a center electrode lamina, an electrically conductive shield lamina on each side of said center electrode lamina and an insulating barrier lamina of dielectric material between each shield lamina and the center electrode lamina, said barrier laminae and said center electrode lamina, together providing a fixed gap betwen said shield laminae, said gap having a width of the order of the minimum wave length of the signal to be sensed, preferably less than 0.002 of an inch, and means to electrically couple said center electrode and said shield laminae to said amplifier.

The improved frontal electrode of this invention willl hereinafter be referred to as a "guarded" electrode.

The guarded playback electrode of this invention has been particularly advantageously used in apparatus for the reproduction of signals recorded by a process based on the discovery that as a dielectric recording medium passes between a pair of electrodes above a threshold voltage a current begins to flow in the electrode circuit and increases rapidly with voltage. At voltages above the threshold the current is of a substantial magnitude and continues so long as the medium continues to move past the electrode. When a signal is applied to the electrodes at voltages above the threshold value with the recording medium moving between the electrodes, it is found that the medium receives a charge pattern, corresponding to the signal, which cannot be removed by wiping the surface of the medium. Repeated playback of a signal recorded by this process by moving the medium past electrodes coupled to an amplifier does not destroy the recorded signal. The frequency response and dynamic range of signals recorded by this process approach those of magnetic recording. The guarded playback electrode system of this invention is particularly advantageous for improving the high frequency response, and particularly the signal-to-noise ratio at high frequencies of recordings made by this process. It is to be understood, however, that this electrode can be used advantageously to improve the fidelity of the read-out signal to the signal recorded in the medium by any electrostatic process intended for electrical read-out.

A more complete understanding of this invention may be derived from the description which follows which is to be read with reference to the accompanying drawings wherein:

FIGURE 1 schematically illustrates the playback apparatus employed in electrostatic recording and adapted to this invention.

FIGURE 2 schematically represents the relationship of recorded wave patterns in the medium to the electrodes.

Figure 1:
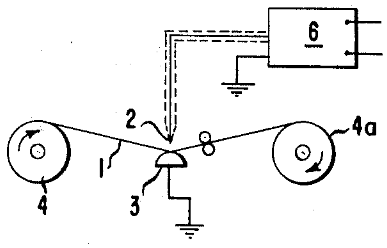

Reference is made to FIGURE 1 for an understanding of the apparatus for electrostatic playback, for which this invention is especially adapted. The recorded medium 1, in the form of a pre-recorded, high resistivity (electrical) dielectric tape, such as a pre-recorded polyester tape, is drawn in conventional manner past frontal electrode 2 and backing electrode 3 from supply reel 4 to takeup reel *4a* by drive capstan 5. An electromotive force is induced in electrodes 2 and 3 by relative movement of opposed, spaced electrodes 2 and 3 and medium 1 which contains charges or internal charge displacements corresponding to the recorded signal. The signal from electrodes 2 and 3 is amplified by amplifier 6, the output of which is transmitted to a loudspeaker or appropriate measuring devices. For the purposes of demonstration of this invention the output is fed to a Hewlett-Packard model 302 harmonic wave analyzer which enables the determination of the magnitude of the output at any specific frequency over the audible frequency range.

In the usual practice the electrode structure comprises a frontal electrode which resembles a knife edge, and a rounded, or relatively blunt resilient backing electrode.

Figure 2:
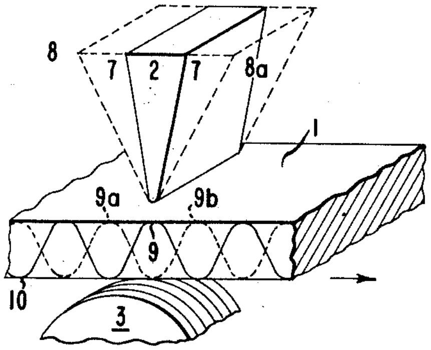

Since spacing the electrodes away from the recorded medium causes less wear on the electrodes and the recorded medium, this arrangement is preferred and usually practiced. The manner in which the signal is induced in the electrode is illustrated in FIGURE 2. Recorded medium 1, has charges or charge distortions distributed in the tape according to the recorded signal. This charge distribution is illustrated by a sinusoidal wave, although it is to be understood that the usual form of an audio signal is somewhat more random. Continuous sinusoidal line 9 and broken lines *9a*–*9b* are representative only of charge intensity. As recorded medium 1 approaches electrode 2, the high intensity of positive charge 9 induces a charge of opposite polarity in electrode 2. It can be seen from consideration of FIGURE 2 that as the charge peak approaches from *9a* it can induce a charge to some extent in electrode 2 before it actually reaches the point of closest proximity represented by peak 9. This causes a damping action on the induced signal. Similarly, with shorter wavelengths or pulses two of the wavepeaks would have a simultaneous effect on the electrode, resulting in poor resolution. If electrode 2 has a more obtuse angle facing the recorded medium, as shown by faces 8 and *8a*, then the decrease in high frequency response is more pronounced. Thus, the preferred design has an electrode that is as sharp as possible, but a point is reached where increasing sharpness effects no further improvement in high frequency response. It should be observed that the response is critical to the sharpness of only one of the electrodes, and is relatively insensitive to the sharpness of the cooperating backing electrode 3.

Figure 3:
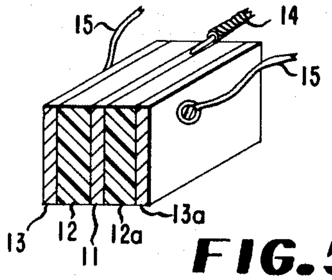
FIGURE 3 is a perspective view of the basic elements of the guarded electrode structure of this invention.
Figure 4:
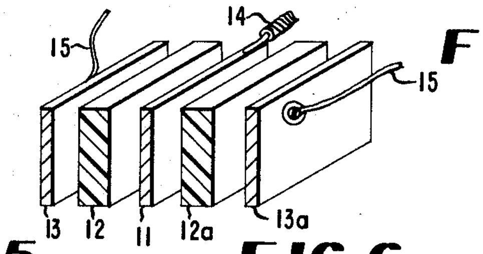
FIGURE 4 is an exploded view of the electrode shown in FIGURE 3.
Figure 5:
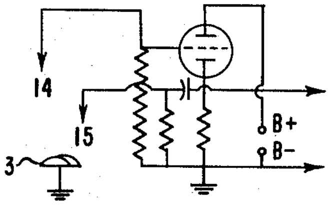
FIGURE 5 is a schematic diagram of a preferred input circuit.

In operation in accordance with this invention the deleterious effect of adjacent waveforms on the sensing of higher frequencies (shorter wavelengths) is overcome by the use of conductive guards adjacent to, but insulated from, the frontal sensing electrode. Such a structure is illustrated in FIGURES 3 and 4. Central electrode 11 is essentially a thin metal (i.e., electrically conductive) blade with parallel faces, insulating layers 12 and *12a* are of a high resistivity material; such as polyethylene, a fluorocarbon polymer or polyethylene terephthalate. Conductive shields 13 and *13a* are of metal, preferably of such hardness as to resist wear. The gap formed between the two shields should be of a dimension of the order of the wavelength of the highest frequency to be reproduced, and preferably should not be 0.002 of an inch. The entire face of the sandwich electrode adjacent to the medium is constructed so as to be uniformly spaced from the recorded medium. Lead 14 provides the input to the amplifier; backing electrode 3, of FIGURE 2 is grounded to the frame of the reproducer, as is one side of the amplifier input, so as to complete the input circuit. The shields may be grounded, but due to diminished output of the sandwich electrode, it is desirable to drive the shields with the output of a cathode-follower amplifier of the input. Further, since the shields and the central electrode will be in phase, due to the in-phase relationship of the cathode-follower output, the potential across the gap is minimized. The preferred input circuit is shown schematically in FIGURE 5.

Figure 6:
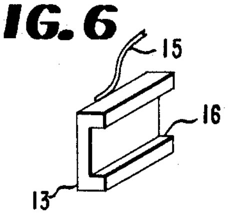
FIGURE 6 is a view showing an undercut portion of a conductive shield lamina.

In order to illustrate the particular advantage of this invention, and to illustrate the critical conditions, more detailed consideration of the recording and playback are useful. Recordings were made on an electrostatic recorder of a design and according to methods described earlier at selected frequencies from 50 to 20,000 cycles per second. The output of a Hewlett-Packard audio oscillator was fed directly to the recorder input. Controls were set at conditions determined to provide the best recording. At selected single frequencies at 10 cycle intervals in the range below 100 cycles per second, at every 100 cycles from 100 to 1000 cycles per second, at every 1000 cycles above 1000 cycles per second, sine waves were recorded on separate sections of half mil "Mylar" (Registered Trademark—E.I. du Pont de Nemours & Co., Inc.) polyester film tape, at a speed of 7½ inches per second. These separate portions were played back, with the output fed to a Hewlett-Packard model 302 harmonic wave analyzer. The signal output at each frequency and the total noise level were determined. This procedure was repeated at each frequency with the unguarded blade electrode and with guarded electrodes in which the insulated gap between the shields was varied. The composition and thickness of the center electrode is not critical so long as proper electrical conductivity, mechanical strength and resistance to wear caused by contact with the record medium are afforded. Gold leaf was used, as was 0.3 mil tungsten foil, but generally 1 mil aluminum foil or a metallized coating (aluminum) on one face of the insulating barrier were found most convenient. The insulating barrier between the center electrode and the guards preferably was of a high volume resistivity ($10^{10}$ ohm-cm.) polymeric organic film of the desired thickness. Films of polyethylene, polypropylene, "Mylar" films of fluorinated hydrocarbon polymers are among the materials found useful as insulating barriers. The metal guards may be of any conveniently worked metal; stainless steel has been found satisfactory. It has been advantageous to undercut the guard block on the side adjacent to the insulation, as shown by 16 of FIGURE 6. This reduces the electrical capacitance between the guards electrodes and the center electrode. It is also preferred in assembly of the sandwich-like structure of the guarded electrode, to clamp it in a supporting fixture and to pot the entire electrode structure, with the signal-sensing face exposed, in a resin (e.g., polystyrene or polyester) to maintain dimensional stability and facilitate mounting on the playback apparatus.

Figure 7:
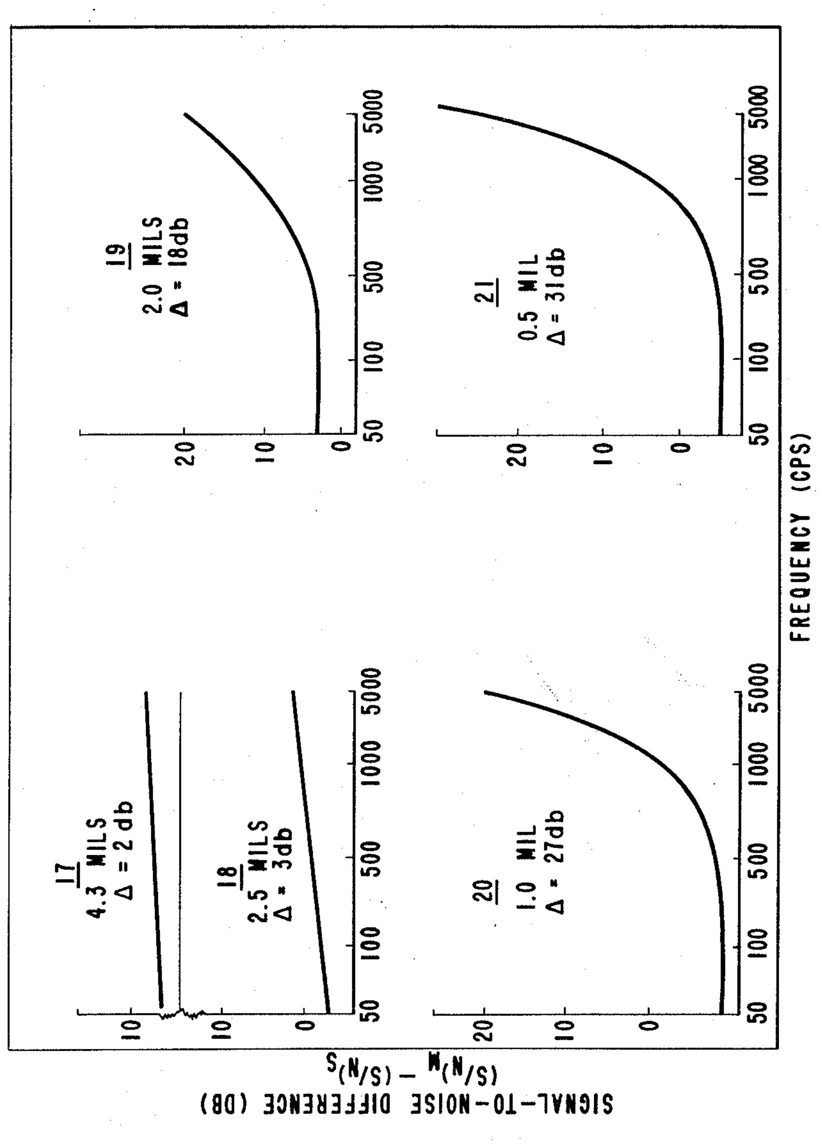
FIGURE 7 illustrates graphically the signal-to-noise ratio of various guarded electrodes.

Guarded electrodes with total gaps (center electrode plus two insulating barriers) in the range from 0.5 to 5.0 mil were constructed. The performance of the 5.0 mil structure was substantially the same as the unguarded blade electrode; significant improvement was noticed only at total gaps less than 2.0 mils. FIGURE 7 illustrates the improvement in overall performance of various gap thickness. The curves represent the difference in the signal-to-noise (total) ratio over the operable frequency range between the electrodes of various total gap thicknesses (center electrode plus two insulating barriers) and the signal-to-noise ratio of the 5.0 mil gap electrode which is substantially equivalent to the unguarded blade electrode. Inspection of FIGURE 7 reveals that the electrodes having a total gap of 4.3 (curve 17) and 2.5 mils (curve 18) produce only very slight change in the signal-to-noise ratio as the frequency increases. With the total gap of two mils or less (2.0 mils, curve 19, 1.0 mil curve 20, and 0.5 mil curve 21), however, a surprising improvement in signal-to-noise ratio occurs above about 500 cycles per second. The improvement effected by the electrodes having gaps less than 2 mils is readily apparent to the ear. A slight reduction in the signal-to-noise ratio in the range from 50 to about 500 cycles is not discernible, since this is in the range of the maximum output and maximum signal-to-noise ratio; the improvement is quite noticeable in the higher frequency range where the performance of the unguarded blade is poor.

Figure 8:
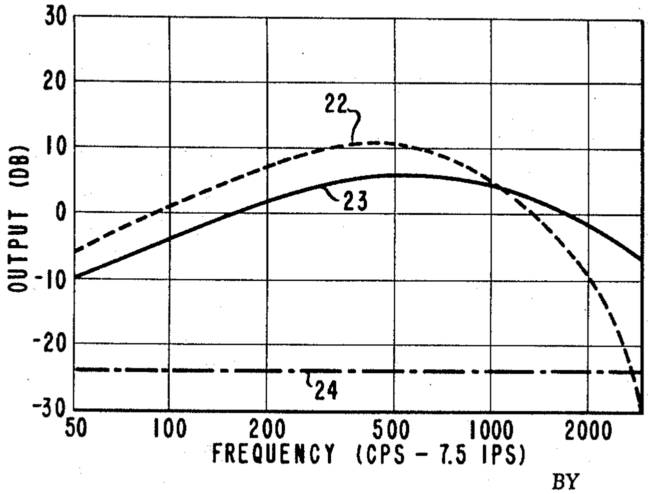
FIGURE 8 illustrates the relative output of a guarded and unguarded electrode.

FIGURE 8 illustrates the output as a function of frequency with a 5.0 mil gap electrode, curve 22, and with a 0.5 mil gap electrode, curve 23, and a plot of the total noise level 24. (Tones were recorded and played back at 7.5 inches per second.) The output of the wider gap electrode is seen to go into the noise at about 3000 cycles per second.

It will be apparent from the foregoing disclosure that the guarded electrode having a gap less than 2 mils, as disclosed, is particularly advantageous in increasing the high frequency output and improving the signal-to-noise ratio over that obtained with a single unguarded blade electrode. Moreover, driving the shields with the output of the first stage amplifier provides increased output and minimizes playback noise.

I claim:

1. In apparatus for the playback of information from electrostatically recorded dielectric medium comprising, in combination, a frontal signal sensing electrode, an opposed backing electrode, means for passing between said electrodes a dielectric material which contains electrostatic charges corresponding to an electrostatically recorded signal whereby to induce in said electrodes an electric signal of an electromotive force proportional to said charges, and amplifier means effective to amplify said induced signal, the improvement which comprises a frontal electrode of laminar construction comprising a center electrode lamina, an electrically conductive shield lamina on each side of said center electrode lamina, and an insulating barrier lamina of dielectric material between each shield lamina and the center electrode lamina, said barrier laminae and the center electrode lamina together providing a fixed gap between said shield laminae, said gap having a width less than 0.002 of an inch, and means to conductively couple said central electrode and said shield laminae to said amplifier means.

2. The apparatus of claim 1 wherein each shield lamina is undercut at its inner surface whereby to reduce the electrical capacitance between said shield laminae and said center electrode.

3. The apparatus of claim 1 wherein the shield laminae are conductively coupled to said amplifier means at ground potential of said amplifier means.

4. The apparatus of claim 1 wherein said amplifier means comprises a plurality of amplifying stages and said shield laminae are conductively coupled to the output of the first stage of said amplifier means.

References Cited by the Examiner

UNITED STATES PATENTS

| | | | |
|---|---|---|---|
| 3,057,966 | 10/62 | Heller | 346—74 |
| 3,098,126 | 7/63 | Kaspaul | 340—174.1 |

FOREIGN PATENTS

| | | |
|---|---|---|
| 1,062,960 | 8/59 | Germany. |

OTHER REFERENCES

Publication: IBM Technical Disclosure Bulletin "Magnetic Transducer Assembly," vol. 3, No. 4, September 1960, pages 13–14.

IRVING L. SRAGOW, *Primary Examiner.*